United States Patent [19]

Beacham et al.

[11] 4,165,040

[45] Aug. 21, 1979

[54] NOZZLE

[75] Inventors: Bryan Beacham, Wokingham; Gordon W. Sutton, Bisley, both of England

[73] Assignee: The British Petroleum Company Limited, Sunbury-on-Thames, England

[21] Appl. No.: 830,832

[22] Filed: Sep. 6, 1977

[30] Foreign Application Priority Data

Sep. 8, 1976 [GB] United Kingdom ............... 37182/76

[51] Int. Cl.² .............................................. B05B 1/00
[52] U.S. Cl. .................................. 239/600; 431/170; 432/15
[58] Field of Search .............................. 239/600, 424; 118/DIG. 5; 431/7, 170; 432/15, 58; 122/4 D

[56] References Cited

U.S. PATENT DOCUMENTS

| | | | |
|---|---|---|---|
| 3,861,862 | 1/1975 | Steever et al. | 432/15 |
| 3,958,916 | 5/1976 | Barker et al. | 431/170 |

*Primary Examiner*—James B. Marbert
*Attorney, Agent, or Firm*—Morgan, Finnegan, Pine, Foley & Lee

[57] ABSTRACT

An exchangeable or removable nozzle arrangement for use in a fluidized bed furnace is movable and in sealing contact with a surrounding sleeve at one end of the nozzle and may be withdrawn from the sleeve through a valve at the other end of the sleeve. An inlet to the space between the sleeve and the nozzle is connected to a source of pressurized fluidizing gas. Upon removal of a nozzle, while the furnace is under load, the bed is maintained in its fluidized state.

10 Claims, 2 Drawing Figures

NOZZLE

The present invention relates to nozzles and distributor plates containing such nozzles for fluidised bed furnaces.

A fluidised bed furnace is operated by blowing a combustible mixture of air and a fuel through a bed of inert particulate material to maintain the bed in a fluidised state. The fuel, which may be solid, liquid or gaseous, or a mixture, burns within the bed which is thereby maintained at an elevated temperature, e.g. in the range 700°–1000° C.

Fluidised bed furnaces are capable of very high heat outputs and good heat transfer characteristics.

In large scale fluidised bed furnaces particularly using oil as fuel, it is necessary to periodically check the state of the fuel injection nozzles, for example, for maintenance purposes so as to enable prolonged bed operation under optimum conditions.

The present invention is directed towards this problem and envisages the use of injection nozzles which are exchangeable during fluidised bed operation.

Thus according to the invention there is provided a nozzle arrangement suitable for use in a fluidised bed, said arrangement comprising a nozzle having a surrounding sleeve, the nozzle being movable and in sealing contact with its surrounding sleeve at one end of the sleeve, an inlet for a pressurised gas to the space between the sleeve and the nozzle, and a valve at the other end of the sleeve through which the nozzle may be withdrawn from the sleeve.

By the term "in sealing contact" is meant close enough to substantially prevent bed particles from falling into the surrounding sleeve.

In use of the removable nozzle with a fluidised bed, withdrawal of the nozzle from the sleeve enables the pressurised gas to pass into the bed whereupon the bed material is prevented from falling into the sleeve by an air cushioning effect.

One or more of the nozzles are preferably incorporated into a distributor plate. Thus in an oil fired fluidised bed, a distributor plate may have one or more removable nozzles being supplied with fuel oil and air and a number of non-removable nozzles for supply of air to the fluidised bed. If and when the oil nozzles block or require servicing they may be removed preferably one at a time from the bed while still maintaining fluidisation and increasing oil flow to the remaining nozzles so as to substantially maintain the bed temperature. The nozzles are preferably moved by sliding through the surrounding sleeve.

For an oil fired fluidised bed furnace, the distributor plate preferably has an air plenum chamber, most preferably also having a fuel gas chamber for use during start up of the fluidised bed. There may also be a liquid fuel chamber incorporated in the distributor plate.

In one embodiment of the invention, the surrounding sleeve for the nozzle is connected to the air plenum chamber and the main fluidising air supply provides the source of pressurised gas also for the space between the sleeve and the removable nozzle. This embodiment of the invention is relatively straightforward in design and does not require any major structural changes from an existing fixed nozzle bed. However in the case of failure of the pressurised gas supply, the bed material will slump into the air chamber, and the second embodiment of the invention is an attempt to overcome this drawback, whilst offering the facility of removal of bed material for analysis of bed material, reducing bed height for load control, etc., under slumped or fluidised conditions.

In a second embodiment of the invention, the surrounding sleeve for the nozzle may be a partition spaced from the main air supply tube and the nozzle and isolating the space between the nozzle and the tube from the air chamber of the fluidised bed distributor plate. The space between the sleeve and the nozzle then has a separate inlet for pressurised gas. The pressurised gas for the space between the sleeve and the nozzle may be the same as or independent of the pressurised gas for the fluidisation of the bed.

The valve through which the nozzle may be withdrawn to separate it from its sleeve is preferably a ball valve. During nozzle removal as the nozzle passes out of the valve, some compressed air may escape but this loss does not usually present a problem. However to avoid this loss of compressed air, it is desirable to have a nozzle tube seal below the ball valve which maintains the seal against escape of compressed air whilst the ball valve is being closed. A similar purpose is served by this nozzle tube seal during replacement of the nozzle whilst the bed is under load. The nozzle tube seal preferably comprises an annular polymeric seal in a surrounding seat through which the nozzle is drawn.

The invention will now be described by way of example with reference to FIGS. 1 and 2 of the accompanying drawings.

Figure 1:
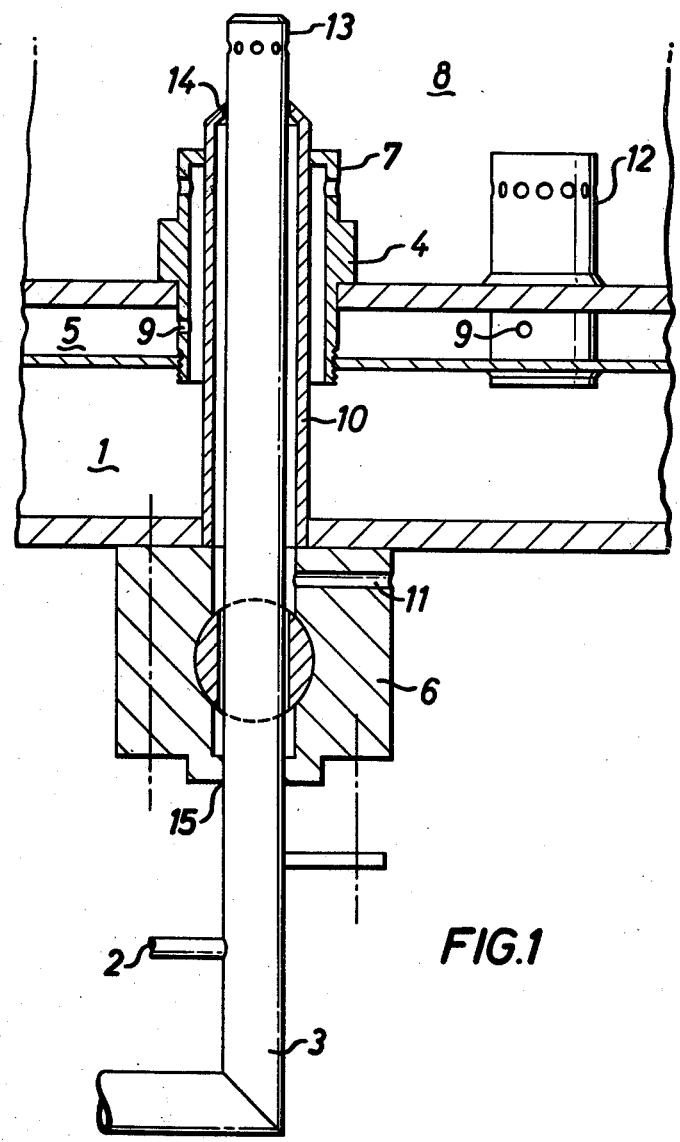
FIG. 1 shows a vertical section through one embodiment of an exchangeable fuel nozzle system using a nozzle guide tube.

In FIG. 1, the distributor plate assembly for a fluidised bed furnace comprises a plenum chamber 1, a fuel oil supply entry 2 and a vertical assembly of three co-axial tubes (3. 4. 10). The inner tube 3 of the co-axial tubes extends downwardly to a ball valve 6 (Worcester Type 44 1½ inch diameter) passing through the air plenum chamber 1 and a fuel gas chamber 5. The shorter outer tube 4 connects directly with the air plenum chamber 1 and the fuel gas chamber 5 and terminates in a head 7 adapted to supply fluidising combustion air to the fluidised bed 8. (During start-up of the fluidised bed, the head 7 supplies a mixture of combustion air and fuel gas to the fluidised bed 8. The apertures 9 allow the fuel gas from the fuel gas chamber 5 to be entrained into the air tube 4). The inner and outer tubes 3, 4 are spaced apart from each other, the inner tube 3 being surrounded by a guide tube 10. At a point between the valve 6 and the air plenum chamber 1, a source of compressed air 11 is supplied to the space between the guide tube 10 and inner tube 3. Separate air nozzles 12 are used to distribute air (and gas during start-up) through holes 9 so as to maintain the bed in a state of fluidisation.

Fuel oil is supplied to the interior walls of the inner tube 3 through inlet 2 at a point below the ball valve 6 and air is also supplied to the tube 3 at its mouth. The oil thus introduced to the interior of the tube 3 passes up the tube 3 in a stream of air to form a climbing film which eventually passes through the outlet head 13 of the tube 3 and into the fluidised bed 8.

The oil tube 3 in its operating position is thus surrounded by a guide tube or sleeve 10 which tapers at the top 14 to give a loose fit between the oil tube 3 and guide tube 10.

When it is desired to remove a nozzle 3 from the distributor plate during operation of the bed, the following procedure is adopted. A source of compressed air 11 is connected to the guide tube 10. The nozzle is then gradually withdrawn and as the nozzle head 13 passes the top 14 of the annular sleeve, the compressed air source 11 provides support for the fluidised bed and prevents bed material entering the guide tube 10. Nozzle withdrawal is continued until the head 13 is in position between the ball valve 6 and a nozzle tube seal 15. The nozzle 3 can be completely removed after closing the ball valve 6 thus permitting replacement or inspection as desired. The replacement procedure is a reversal of the removal procedure.

The guide tube 10 acts to isolate the nozzle 3 from the plenum chamber 1 and allows removal of fluid bed material at a controlled rate dependent on the air flow through supply tube 11 and the degree of opening of ball valve 6. The amount of fluidising air being supplied to the bed is not affected during nozzle removal and should any collapse of bed material occur into the guide tube 10, the material may be dealt with relatively easily. The fuel injection nozzles may be removed with the bed in a slumped or fluidised state, and in the latter case the bed is maintained in its fluidised state subsequent to nozzle removal.

Figure 2:
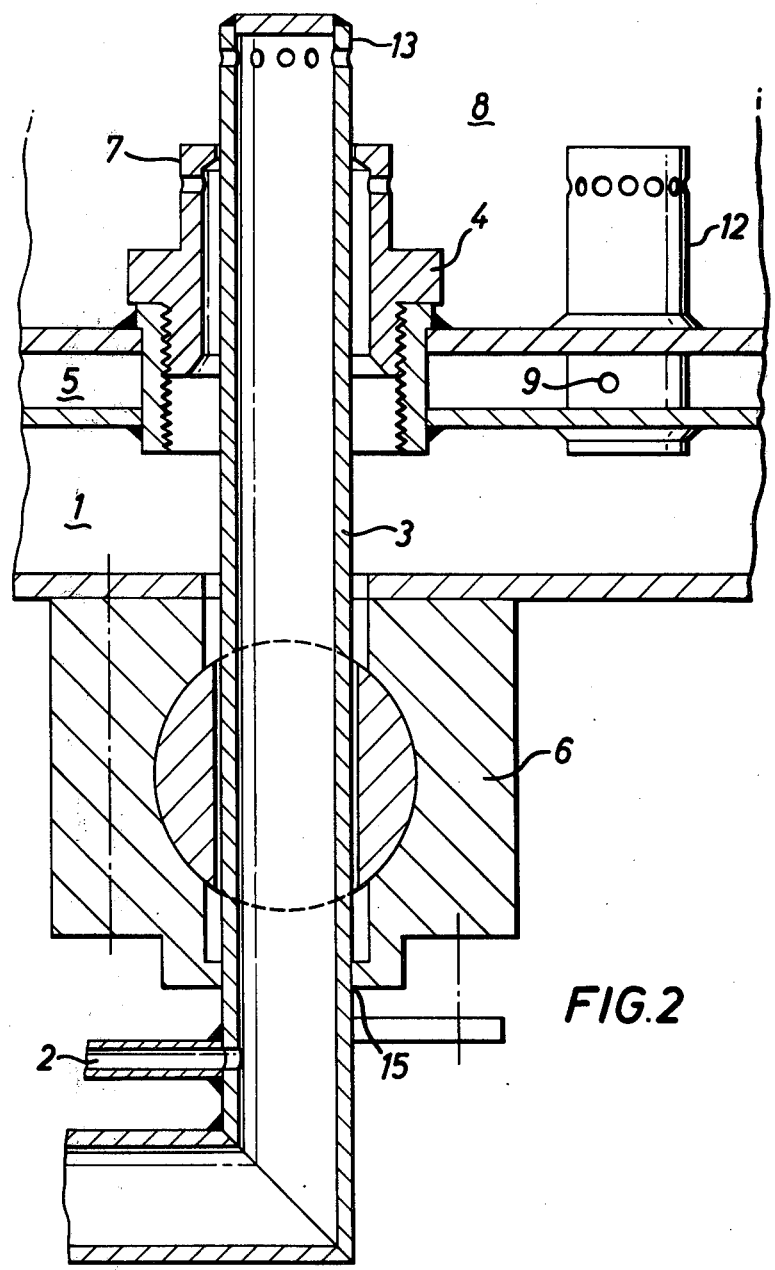
FIG. 2 shows a vertical section through a further more simplified embodiment of an exchangeable fuel nozzle system.

FIG. 2 shows a more basic version of FIG. 1 in which only two co-axial tubes are used.

To remove the fuel injection nozzle from the distributor plate during operation of the fluidised bed, the following procedure is adopted. The nozzle 3 is gradually withdrawn until the nozzle head 13 passes the top of concentric tube 4. Upon further withdrawal, compressed air from the plenum chamber 1 rushes through the gap now created between the top of tube 4 and the nozzle head 13. This compressed air from the plenum chamber 1 passes into the bed 8 and helps to maintain fluidisation. Nozzle withdrawal is then continued through the ball valve 6 in the same manner as described under FIG. 1. The replacement procedure is substantially a reversal of the removal procedure.

In this simplified version, no auxiliary compressed air supply is required, the device relying upon the supply of compressed air from the plenum chamber during nozzle removal. Although this arrangement offers no safeguards to bed material falling into the plenum chamber in the event of compressed air failure, it is simple to manufacture and relatively efficient in operation.

We claim:

1. A nozzle arrangement for a fluidised bed furnace comprising, in combination: a fuel injection nozzle extending into said furnace; a sleeve surrounding and spaced apart from said fuel injection nozzle at the entry of said nozzle into said furnace; partition means in spaced relation between said fuel injection nozzle and said surrounding sleeve; means mounting said fuel injection nozzle for movement within said partition means; said partition means including means in sealing contact with said nozzle within said furnace; inlet means for supplying a pressurised gas to the space between said partition means and said nozzle, and valve means through which said nozzle may be withdrawn from said furnace while the furnace is under load and the bed is in a fluidised state.

2. A nozzle arrangement according to claim 1 in which the valve is a ball valve.

3. A nozzle arrangement according to claim 2 in which the ball valve is a Worcester valve.

4. A nozzle arrangement according to claim 1, wherein said nozzle is mounted for sliding movement within said partition means into and out of said furnace.

5. A nozzle arrangement according to claim 1, including a seal through which said fuel injection nozzle is withdrawn subsequent to its passage through said valve means.

6. A nozzle arrangement according to claim 5, wherein said seal is an annular ring.

7. A nozzle arrangement according to claim 1, including a distributor plate; means mounting said surrounding sleeve in said distributor plate; and said distributor plate including a chamber for supplying pressurised fluidising gas to said fluidised bed.

8. A nozzle arrangement according to claim 7, wherein said gas chamber connects directly to the space between said partition means and said surrounding sleeve.

9. A nozzle arrangement according to claim 8, wherein the supply of pressurised gas to the space between said fuel injection nozzle and said partition means is independent of the supply of fluidising gas to the chamber.

10. A nozzle arrangement according to claim 1, wherein said partition means comprises a tube which is substantially co-axial with said fuel injection nozzle, and said means in sealing contact with said nozzle comprises a restricted diameter portion which surrounds said nozzle sufficiently close to prevent bed particles from falling between said nozzle and the partition tube.

* * * * *